US012644762B2

(12) United States Patent
Kuo et al.

(10) Patent No.: US 12,644,762 B2
(45) Date of Patent: Jun. 2, 2026

(54) SYSTEM FOR RECOGNIZING SOUNDSCAPES

(71) Applicant: FAR EASTONE TELECOMMUNICATIONS CO., LTD., Taipei City (TW)

(72) Inventors: Chun-Chieh Kuo, Taipei City (TW); Huei-San Lin, Taipei City (TW); Chih-Wei Chien, Taipei City (TW); Hua-Pei Chiang, Taipei City (TW); Chyi-Dar Jang, Taipei City (TW); Li-Chi Sheng, Taipei City (TW); Huai-Kuei Wu, Taipei City (TW); Che-Yu Liao, Taipei City (TW); Tsung-Jen Wang, Taipei City (TW); Chi-En Chien, Taipei City (TW); Teng-Ta Yang, Taipei City (TW); Chia-Fu Ho, Taipei City (TW)

(73) Assignee: FAR EASTONE TELECOMMUNICATIONS CO., LTD., Taipei City (TW)

( * ) Notice: Subject to any disclaimer, the term of this patent is extended or adjusted under 35 U.S.C. 154(b) by 164 days.

(21) Appl. No.: 18/760,430

(22) Filed: Jul. 1, 2024

(65) Prior Publication Data

US 2025/0347553 A1      Nov. 13, 2025

(30) Foreign Application Priority Data

May 9, 2024    (TW) .................................. 113117194

(51) Int. Cl.
*H04R 1/02* (2006.01)
*G01H 17/00* (2006.01)

(52) U.S. Cl.
CPC ............... *G01H 17/00* (2013.01); *H04R 1/02* (2013.01)

(58) Field of Classification Search
CPC ......... H04R 3/005; H04R 1/406; G10L 15/08; G10L 17/00; G10L 15/20
See application file for complete search history.

(56) References Cited

FOREIGN PATENT DOCUMENTS

CN          219738538 U  *  9/2023

* cited by examiner

*Primary Examiner* — Kile O Blair
(74) *Attorney, Agent, or Firm* — MUNCY, GEISSLER, OLDS & LOWE, P.C.

(57) ABSTRACT

A system for recognizing soundscapes includes audio extractors, audio sampling and modulation circuits, an audio recognition device, environment detectors, a data integration circuit, a wireless communication module, a wireless base station, and a cloud server. The audio extractors extract soundscape signals so that the audio sampling and modulation circuits generate audio modulation signals. The audio recognition device recognizes the audio modulation signals to generate audio features. Based on biological audio models respectively corresponding to different species, the audio recognition device determines the number of the species corresponding to the audio features, thereby adjusting the sampling rate, the working period, or both of the soundscape signal extracted by each audio extractor. The environment detectors detect different environment-related data. The data integration circuit synchronizes the environment-related data, the audio features, the species corresponding thereto and uploads them to the server through the base station and the communication module.

14 Claims, 6 Drawing Sheets

SYSTEM FOR RECOGNIZING SOUNDSCAPES

BACKGROUND OF THE INVENTION

This application claims priority for the TW application No. 113117194 filed on 9 May 2024, the content of which is incorporated by reference in its entirely.

FIELD OF THE INVENTION

The present invention relates to a recognition system, particularly to a system for recognizing soundscapes.

DESCRIPTION OF THE RELATED ART

Ecological land has natural attributes and provides ecological services and ecological products for the region. Ecological land protection is the basis for high-quality regional development and the key to the construction of ecological civilization. The ecological protection red line is a spatial boundary for mandatory protection based on ecological land, focusing on ecological sensitivity, ecological vulnerability, and important ecological functions. The delineation of ecological protection red lines is related to national ecological security. In the past, the delineation of ecological protection red lines was mostly determined based on remote sensing data, land use survey data, etc. As the important characteristic of ecological landscapes, soundscapes can represent animal activities and human activity phenomena and help more comprehensively reflect the actual ecological conditions of the region.

When collecting soundscapes of biological diversity such as birds using existing technology, there are often problems such as the inability to record at medium or high altitudes, unstable power supply, and the need to manually go up the mountain to collect sound files. In addition, existing recording equipment cannot support mobile networks for automatic transmission to cloud servers. The existing audio files are stored in secure digital (SD) cards. The audio files can only be collected manually on the mountain. Also, it is quite troublesome for batteries that require manual replacement on the mountain to provide the power supply for recording.

To overcome the abovementioned problems, the present invention provides a system for recognizing soundscapes, so as to solve the afore-mentioned problems of the prior art.

SUMMARY OF THE INVENTION

The present invention provides a system for recognizing soundscapes, which achieves a power-saving purpose.

In an embodiment of the present invention, a system for recognizing soundscapes includes audio extractors, audio sampling and modulation circuits, an audio recognition device, environment detectors, a data integration circuit, a wireless communication module, a wireless base station, and a cloud server. The audio extractors are configured to extract soundscape signals and convert the soundscape signals into recording voltages. The audio sampling and modulation circuits are respectively coupled to the audio extractors and configured to respectively perform quantization and digital modulation on the recording voltages to respectively generate audio modulation signals. The audio recognition device is coupled to the audio extractors and the audio sampling and modulation circuits and configured to receive and recognize the audio modulation signals to generate various audio features. Based on biological audio models respectively corresponding to different species, the audio recognition device is configured to determine number of the species corresponding to the various audio features. The audio recognition device is configured to adjust the sampling rate, the working period, or both of the soundscape signal extracted by each of the audio extractors based on the number. When the number is greater than 0, the audio recognition device outputs the various audio features and the species corresponding thereto. The environment detectors are respectively configured to detect different environment-related data. The data integration circuit is coupled to the environment detectors and the audio recognition device and configured to synchronize the environment-related data, the outputted various audio features, and the species corresponding thereto to form sets of synchronization data. The wireless communication module is coupled to the data integration circuit. The wireless base station is wirelessly connected to the wireless communication module. The cloud server is coupled to the wireless base station and configured to receive the sets of synchronization data through the wireless base station and the wireless communication module.

In an embodiment of the present invention, the digital modulation includes amplitude-shift keying (ASK) modulation, phase-shift keying (PSK) modulation, or frequency-shift keying (FSK) modulation.

In an embodiment of the present invention, the different environment-related data include light intensity, images, locations, temperature, humidity, and gas types.

In an embodiment of the present invention, the audio recognition device includes a framing circuit, an audio feature extractor, and an audio processor. The framing circuit is coupled to the audio sampling and modulation circuits and configured to receive the audio modulation signals. The framing circuit is configured to frame the audio modulation signals to generate sets of sound frames. The audio feature extractor are coupled to the framing circuit and configured to receive the sets of sound frames. The audio feature extractor is configured to extract the various audio features from the sets of sound frames based on frequency and intensity corresponding to the sets of sound frames. The audio processor is coupled to the audio feature extractor, the audio extractors, and the data integration circuit and configured to receive the various audio features. The audio processor is configured to determine the number of the species corresponding to the various audio features based on the biological audio models, thereby adjusting the sampling rate, the working period, or both. When the number is greater than 0, the audio processor outputs the various audio features and the species corresponding thereto to the data integration circuit.

In an embodiment of the present invention, the wireless base station is a 3G base station, a 4G base station, a 5G base station, a Bluetooth® base station, or a WiFi base station.

In an embodiment of the present invention, the various audio features include pitch, loudness, and timbre.

In an embodiment of the present invention, when the number of the species corresponding to the various audio features is equal to 0 and the working period is greater than the minimum value, the audio recognition device decreases the working period. When the number of the species corresponding to the various audio features is equal to 0 and the working period is not greater than the minimum value, the audio recognition device keeps the working period unchanged. When the number of the species corresponding to the various audio features is greater than 0 and less than a preset value and the working period is less than the maximum value, the audio recognition device increases the working period. When the number of the species corresponding to the various audio features is greater than 0 and less than the preset value and the working period is not less than the maximum value, the audio recognition device keeps the working period unchanged. When the number of the species corresponding to the various audio features is greater than 0 and not less than the preset value, the audio recognition device increases the working period to the maximum value.

In an embodiment of the present invention, when the number of the species corresponding to the various audio features is equal to 0 and the sampling rate is greater than the minimum value, the audio recognition device decreases the sampling rate. When the number of the species corresponding to the various audio features is equal to 0 and the sampling rate is not greater than the minimum value, the audio recognition device keeps the sampling rate unchanged. When the number of the species corresponding to the various audio features is greater than 0 and less than a preset value and the sampling rate is less than the maximum value, the audio recognition device increases the sampling rate. When the number of the species corresponding to the various audio features is greater than 0 and less than the preset value and the sampling rate is not less than the maximum value, the audio recognition device keeps the sampling rate unchanged. When the number of the species corresponding to the various audio features is greater than 0 and not less than the preset value and the sampling rate is less than the maximum value, the audio recognition device increases the sampling rate to the maximum value.

In an embodiment of the present invention, when the working period is equal to the minimum value and the number of the species corresponding to the various audio features is equal to 0, the audio recognition device decreases the sampling rate to the minimum value. When the working period is equal to the minimum value, the number of the species corresponding to the various audio features is greater than 0, and the sampling rate is less than the maximum value, the audio recognition device increases the sampling rate. When the working period is equal to the minimum value, the number of the species corresponding to the various audio features is greater than 0, and the sampling rate is not less than the maximum value, the audio recognition device keeps the sampling rate unchanged.

In an embodiment of the present invention, the system for recognizing soundscapes further includes a recording processor coupled to the audio extractors and the audio sampling and modulation circuits. The audio extractors are configured to transmit the recording voltages to the recording processor. When the recording processor determines that the recording voltages are greater than or equal to a voltage threshold value, the recording processor respectively transmits the recording voltage to the audio sampling and modulation circuits. When the recording processor determines that the recording voltages are less than the voltage threshold value, the recording processor stops transmitting the recording voltage to the audio sampling and modulation circuits.

In an embodiment of the present invention, the audio extractors comprise condenser microphones, microelectromechanical microphones, or ultrasonic microphones.

In an embodiment of the present invention, the audio extractors have waterproof housings or moisture-proof housings.

In an embodiment of the present invention, the system for recognizing soundscapes further includes at least one triggered electronic device coupled to the audio recognition device. When the audio recognition device determines that the species corresponding to the various audio features includes at least one preset species, the audio recognition device turns on the triggered electronic device.

In an embodiment of the present invention, the triggered electronic device is a digital camera or an electronic speaker.

To sum up, the system for recognizing soundscapes adjusts the sampling rate, the working period, or both of the soundscape signal extracted by the audio extractor based on the number of the species corresponding to the audio features and uses wireless technology to transmit the audio features to the cloud server to achieve the power-saving purpose.

Below, the embodiments are described in detail in cooperation with the drawings to make easily understood the technical contents, characteristics and accomplishments of the present invention.

DETAILED DESCRIPTION OF THE INVENTION

Figure 1:
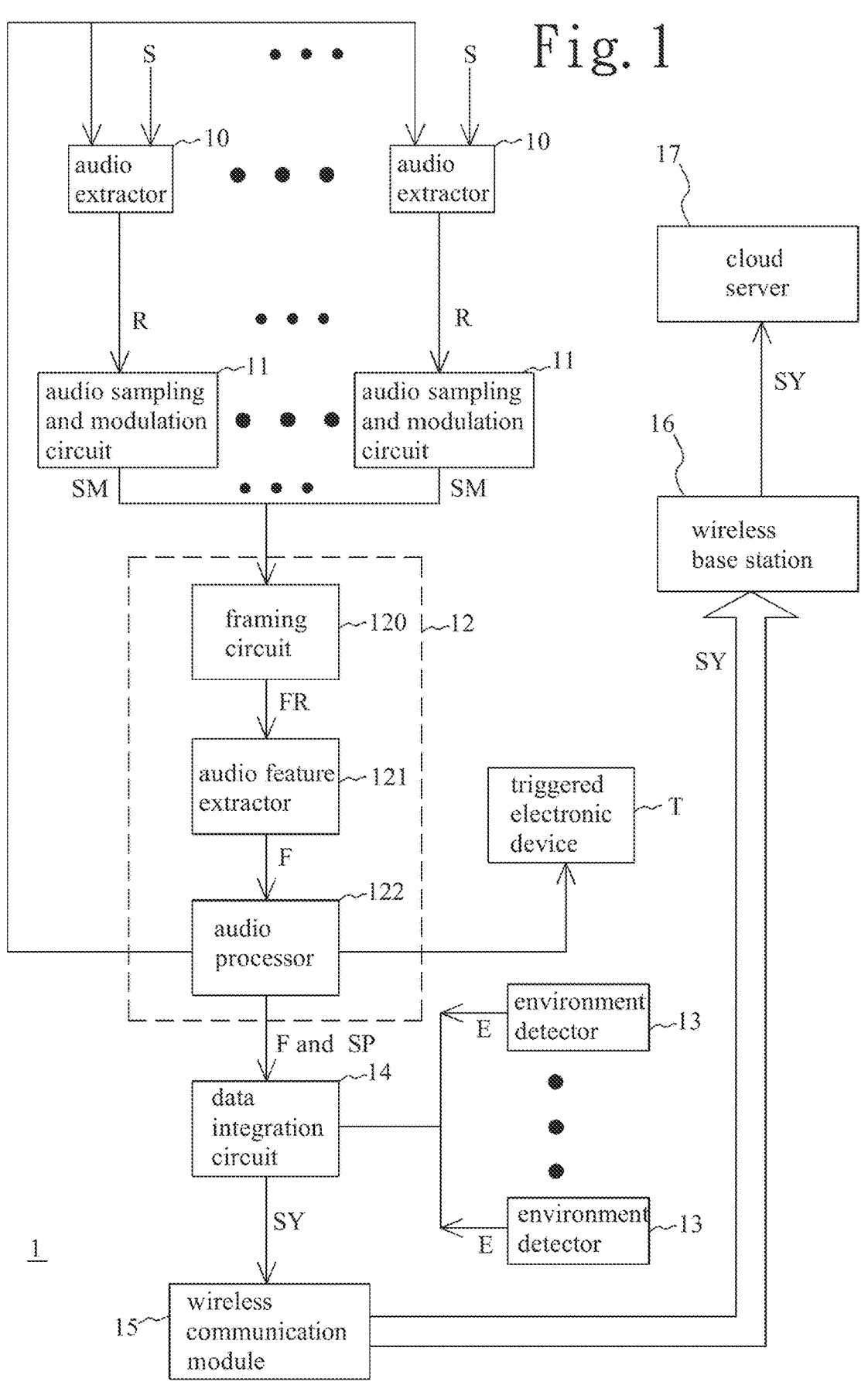
FIG. 1 is a schematic diagram illustrating a system for recognizing soundscapes according to a first embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

When an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

Furthermore, it can be understood that the terms "comprising," "including," "having," "containing," and "involving" are open-ended terms, which refer to "may include but is not limited to so." In addition, each of the embodiments or claims of the present invention is not necessary to achieve all the effects and advantages possibly to be generated, and the abstract and title of the present invention is used to assist for patent search and is not used to further limit the claimed scope of the present invention.

Further, in the present specification and claims, the term "comprising" is open type and should not be viewed as the term "consisted of." In addition, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means. Moreover, when the transmissions or generations of electrical signals are mentioned, one skilled in the art should understand some degradations or undesirable transformations could be generated during the operations. If it is not specified in the specification, an electrical signal at the transmitting end should be viewed as substantially the same signal as that at the receiving end. For example, when the end A of an electrical circuit provides an electrical signal S to the end B of the electrical circuit, the voltage of the electrical signal S may drop due to passing through the source and drain of a transistor or due to some parasitic capacitance. However, the transistor is not deliberately used to generate the effect of degrading the signal to achieve some result, that is, the signal S at the end A should be viewed as substantially the same as that at the end B.

Unless otherwise specified, some conditional sentences or words, such as "can", "could", "might", or "may", usually attempt to express what the embodiment in the present invention has, but it can also be interpreted as a feature, element, or step that may not be needed. In other embodiments, these features, elements, or steps may not be required.

In the following description, a system for recognizing soundscapes adjusts the sampling rate, the working period, or both of a soundscape signal extracted by an audio extractor based on the number of species corresponding to audio features and uses wireless technology to transmit the audio features to a cloud server to achieve a power-saving purpose.

The collection of all sounds in the environment, regardless of the content and source of the sounds, is called a soundscape. The soundscape consists of animal sounds, environmental sounds, and human activity sounds, which can reflect various physical, biological, and social dynamic changes in the environment. The interaction of these elements can be understood based on these sounds. Soundscapes not only represent static images or maps but describe various dynamic changes in the environment. There is a large amount of information in the soundscape that can be used to study the changes in the ecological environment and the interaction between various sound-producing objects. Soundscape ecology generally refers to the science that uses sound to explore the relationship among creatures, humans, and environments. The research focuses on the ebb and flow and interaction of these three sounds and evaluates changes in the environment.

FIG. 1 is a schematic diagram illustrating a system for recognizing soundscapes according to a first embodiment of the present invention. Referring to FIG. 1, the first embodiment of a system 1 for recognizing soundscapes is introduced as follows. The system 1 for recognizing soundscapes includes audio extractors 10, audio sampling and modulation circuits 11, an audio recognition device 12, environment detectors 13, a data integration circuit 14, a wireless communication module 15, a wireless base station 16, and a cloud server 17. The audio sampling and modulation circuits 11, the audio recognition device 12, the data integration circuit 14, and the wireless communication module 15, including hardware, are implemented with one or more processors. The audio extractors 10 include condenser microphones, microelectromechanical microphones, or ultrasonic microphones, but the present invention is not limited thereto. In some embodiments, the audio extractors 10 have waterproof housings or moisture-proof housings. The wireless base station 16 may be, but not limited to, a 3G base station, a 4G base station, a 5G base station, a Bluetooth® base station, or a WiFi base station. Alternatively, the wireless base station 16 may adopt the communication protocol of IEEE 802.11. The audio sampling and modulation circuits 11 are respectively coupled to the audio extractors 10. The audio recognition device 12 is coupled to the audio extractors 10 and the audio sampling and modulation circuits 11. The data integration circuit 14 is coupled to the environment detectors 13 and the audio recognition device 12. The wireless communication module 15 is coupled to the data integration circuit 14. The wireless base station 16 is wirelessly connected to the wireless communication module 15. The cloud server 17 is coupled to the wireless base station 16.

The audio extractors 10 extract soundscape signals S and convert the soundscape signals S into recording voltages R. The audio sampling and modulation circuits 11 respectively perform quantization and digital modulation on the recording voltages R to respectively generate audio modulation signals SM. The digital modulation includes amplitude-shift keying (ASK) modulation, phase-shift keying (PSK) modulation, or frequency-shift keying (FSK) modulation. The audio recognition device 12 receives and recognizes the audio modulation signals SM to generate various audio features F. Based on biological audio models respectively corresponding to different species SP, the audio recognition device 12 determines the number of the species SP corresponding to the various audio features F. The audio recognition device 12 uses a pre-designed model to integrate edge computing technology to perform pre-recognition on the terminal device to reduce analysis burden and network bandwidth. The various audio features F include, but are limited to, pitch, loudness, and timbre. The audio recognition device 12 adjusts the sampling rate, the working period, or both of the soundscape signal S extracted by each of the audio extractors 10 based on the number of species SP corresponding to the various audio features F, thereby achieving the power-saving purpose. The sampling rate can be 8000, 12000, 16000, 22050, 24000, 32000, 44100, 48000, or 96000 Hz. Each audio extractor 10 can extract the soundscape signal S in multiple recording time periods. Each recording time period includes a working time period for extracting the soundscape signal S. Working period=working time period/recording time period. Assume that the recording time period has one hour and that the working time period has 5 minutes. Thus, the working period is 8.33%.

When the number of species SP corresponding to the various audio features F is greater than 0, the audio recognition device 12 outputs the various audio features F and the species SP corresponding thereto. When the number of species SP corresponding to the various audio features F is equal to 0, the audio recognition device 12 does not output any audio feature and species corresponding thereto. In order to understand various parameters of the studied environment when recording the soundscape, thereby improving the understanding of environmental changes and improving the quality of soundscape research, the environment detectors 13 respectively detect different environment-related data E. The environment-related data E include, but are not limited to, light intensity, images, locations, temperature, humidity, and gas types. The data integration circuit 14 may include a global positioning system (GPS) module, a real time clock (RTC) module, or a network time protocol (NTP) module for providing the source of standard time. The data integration circuit 14 synchronizes the environment-related data E, the outputted various audio features F, and the species corresponding thereto in time to form sets of synchronization data SY, such that soundscape researchers understand the studied environment and the different changes and occurrences of creatures during different time periods. For example, a first set of synchronization data SY include first environment-related data E, a first type of audio features F, and first species SP corresponding thereto that occur simultaneously. A second set of synchronization data SY include second environment-related data E, a second type of audio features F, and second species SP corresponding thereto that occur simultaneously. The cloud server 17 receives the sets of synchronization data SY through the wireless base station 16 and the wireless communication module 15.

In some embodiments of the present invention, the audio recognition device 12 may include a framing circuit 120, an audio feature extractor 121, and an audio processor 122. The framing circuit 120 is coupled to the audio sampling and modulation circuits 11. The audio feature extractor 121 is coupled to the framing circuit 120. The audio processor 122 is coupled to the audio feature extractor 121, the audio extractors 10, and the data integration circuit 14. The framing circuit 120 receives the audio modulation signals SM and frames the audio modulation signals SM to generate sets of sound frames FR. The audio feature extractor 121 receives the sets of sound frames FR and extracts the various audio features F from the sets of sound frames FR based on the frequency and the intensity corresponding to the sets of sound frames FR. The audio processor 122 receives the various audio features F. The audio processor 122 determines the number of species SP corresponding to the various audio features F based on the biological audio models, thereby adjusting the sampling rate, the working period, or both. When the number of species SP corresponding to the various audio features F is greater than 0, the audio processor 122 outputs the various audio features F and the species SP corresponding thereto to the data integration circuit 14. When the number of species SP corresponding to the various audio features F is equal to 0, the audio processor 122 does not output any audio feature and species corresponding thereto.

In some embodiments of the present invention, the system 1 for recognizing soundscapes may include at least one triggered electronic device T. For convenience and clarity, the number of the triggered electronic device T is one. For example, the triggered electronic device T may be, but not limited to, a digital camera or an electronic speaker. The triggered electronic device T is coupled to the audio processor 122 of the audio recognition device 12. When the audio processor 122 of the audio recognition device 12 determines that the species SP corresponding to the various audio features F includes at least one preset species, the audio processor 122 of the audio recognition device 12 turns on the triggered electronic device T. Assume that the preset species is a cat and that the triggered electronic device T is a digital camera. When the audio processor 122 determines that the species SP corresponding to the various audio features F includes the cat, the audio processor 122 turns on the digital camera to capture the image of the cat.

Figure 2:
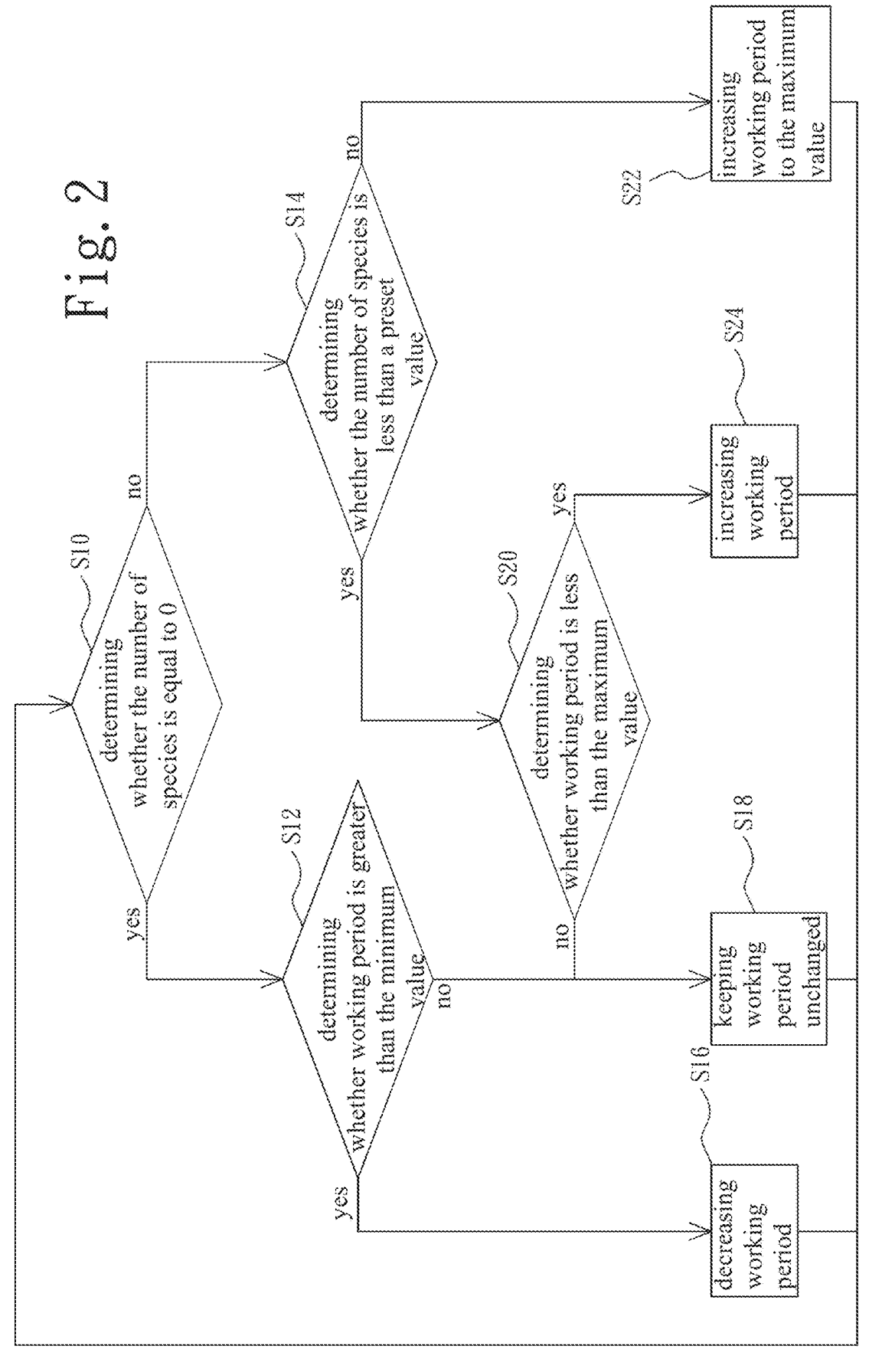
FIG. 2 is a flowchart of operating an audio recognition device according to an embodiment of the present invention.

FIG. 2 is a flowchart of operating an audio recognition device according to an embodiment of the present invention. The flowchart of FIG. 2 is used to reduce power consumption. Please refer to FIG. 1 and FIG. 2. In Step S10, the audio processor 122 of the audio recognition device 12 determines whether the number of species SP corresponding to the various audio features F is equal to 0. When the number of species SP corresponding to the various audio features F is equal to 0, the process proceeds to Step S12. When the number of species SP corresponding to the various audio features F is not equal to 0 such that the number of species SP corresponding to the various audio features F is greater than 0, the process proceeds to Step S14. In Step S12, the audio processor 122 of the audio recognition device 12 determines whether the working period for extracting the soundscape signal S is greater than the minimum value. When the working period is greater than the minimum value, the process proceeds to Step S16. When the working period is not greater than the minimum value such that the working period is equal to the minimum value, the process proceeds to Step S18. In Step S16, the audio processor 122 of the audio recognition device 12 decreases the working period. In Step S18, the audio processor 122 of the audio recognition device 12 keeps the working period unchanged. In Step S14, the audio processor 122 of the audio recognition device 12 determines whether the number of species SP corresponding to the various audio features F is less than a preset value. When the number of species SP corresponding to the various audio features F is less than the preset value, the process proceeds to Step S20. When the number of species SP corresponding to the various audio features F is not less than the preset value, the process proceeds to Step S22. In Step S22, the audio processor 122 of the audio recognition device 12 increases the working period to the maximum value. In Step S20, the audio processor 122 of the audio recognition device 12 determines whether the working period is less than the maximum value. When the working period is less than the maximum value, the process proceeds to Step S24. When the working period is not less than the maximum value such that the working period is equal to the maximum value, the process proceeds to Step S18. In Step S24, the audio processor 122 of the audio recognition device 12 increases the working period. After Steps S16, S18, S22, and S24, the process returns to Step S10.

Figure 3:
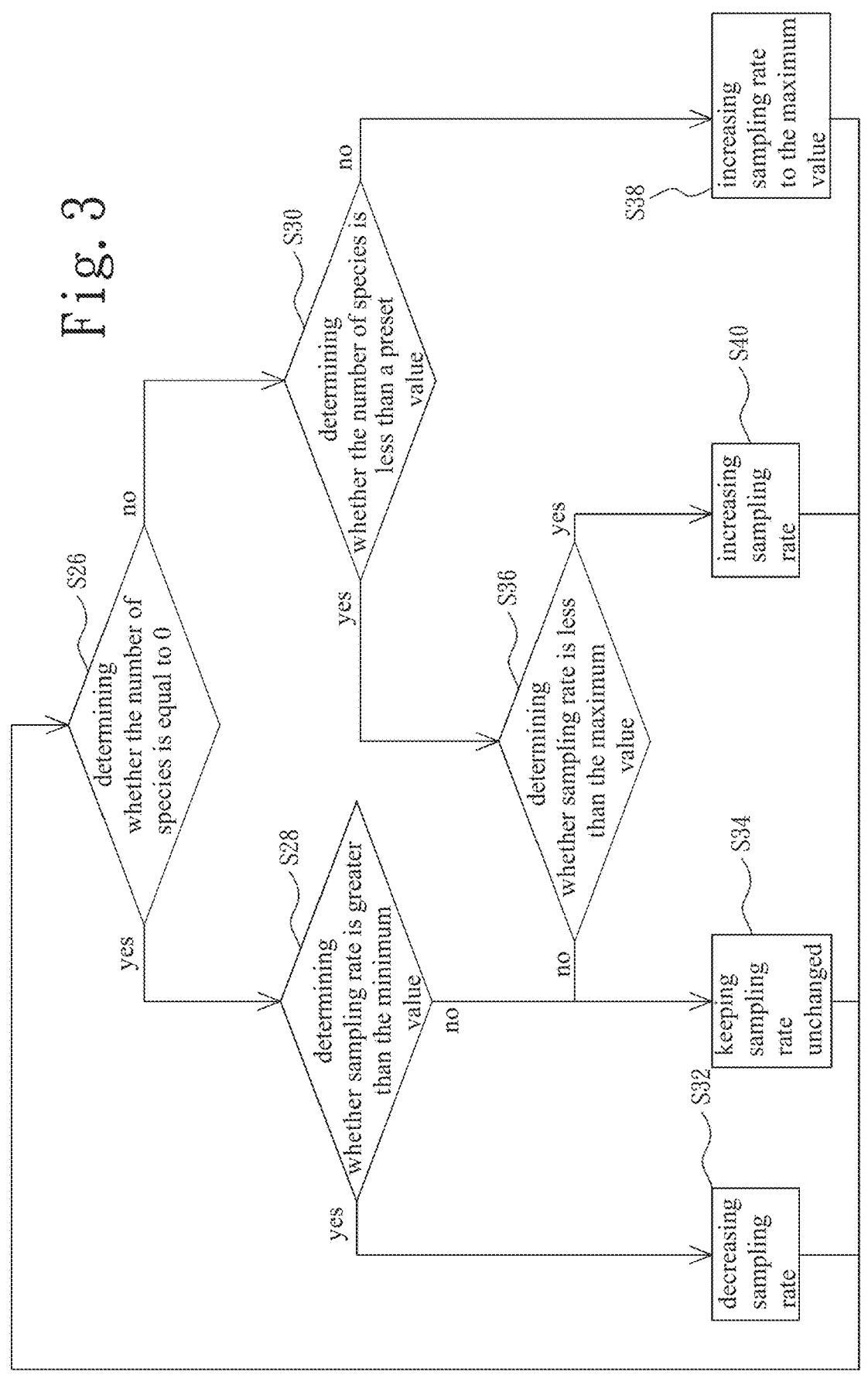
FIG. 3 is a flowchart of operating an audio recognition device according to another embodiment of the present invention.

FIG. 3 is a flowchart of operating an audio recognition device according to another embodiment of the present invention. The flowchart of FIG. 3 is used to reduce bandwidth usage. Please refer to FIGS. 1 and 3. In Step S26, the audio processor 122 of the audio recognition device 12 determines whether the number of species SP corresponding to the various audio features F is equal to 0. When the number of species SP corresponding to the various audio features F is equal to 0, the process proceeds to Step S28. When the number of species SP corresponding to the various audio features F is not equal to 0 so that the number of species SP corresponding to the various audio features F is greater than 0, the process proceeds to Step S30. In Step S28, the audio processor 122 of the audio recognition device 12 determines whether the sampling rate for extracting the soundscape signal S is greater than the minimum value. When the sampling rate is greater than the minimum value, the process proceeds to Step S32. When the sampling rate is not greater than the minimum value such that the sampling rate is equal to the minimum value, the process proceeds to Step S34. In Step S32, the audio processor 122 of the audio recognition device 12 decreases the sampling rate. In Step S34, the audio processor 122 of the audio recognition device 12 keeps the sampling rate unchanged. In Step S30, the audio processor 122 of the audio recognition device 12 determines whether the number of species SP corresponding to the various audio features F is less than a preset value. When the number of species SP corresponding to the various audio features F is less than the preset value, the process proceeds to Step S36. When the number of species SP corresponding to the various audio features F is not less than the preset value, the process proceeds to Step S38. In Step S38, the audio processor 122 of the audio recognition device 12 increases the sampling rate to the maximum value. In Step S36, the audio processor 122 of the audio recognition device 12 determines whether the sampling rate is less than the maximum value. When the sampling rate is less than the maximum value, the process proceeds to Step S40. When the sampling rate is not less than the maximum value such that the sampling rate is equal to the maximum value, the process proceeds to Step S34. In Step S40, the audio processor 122 of the audio recognition device 12 increases the sampling rate. After Steps S32, S34, S38 and S40, the process returns to Step S26.

Figure 4:
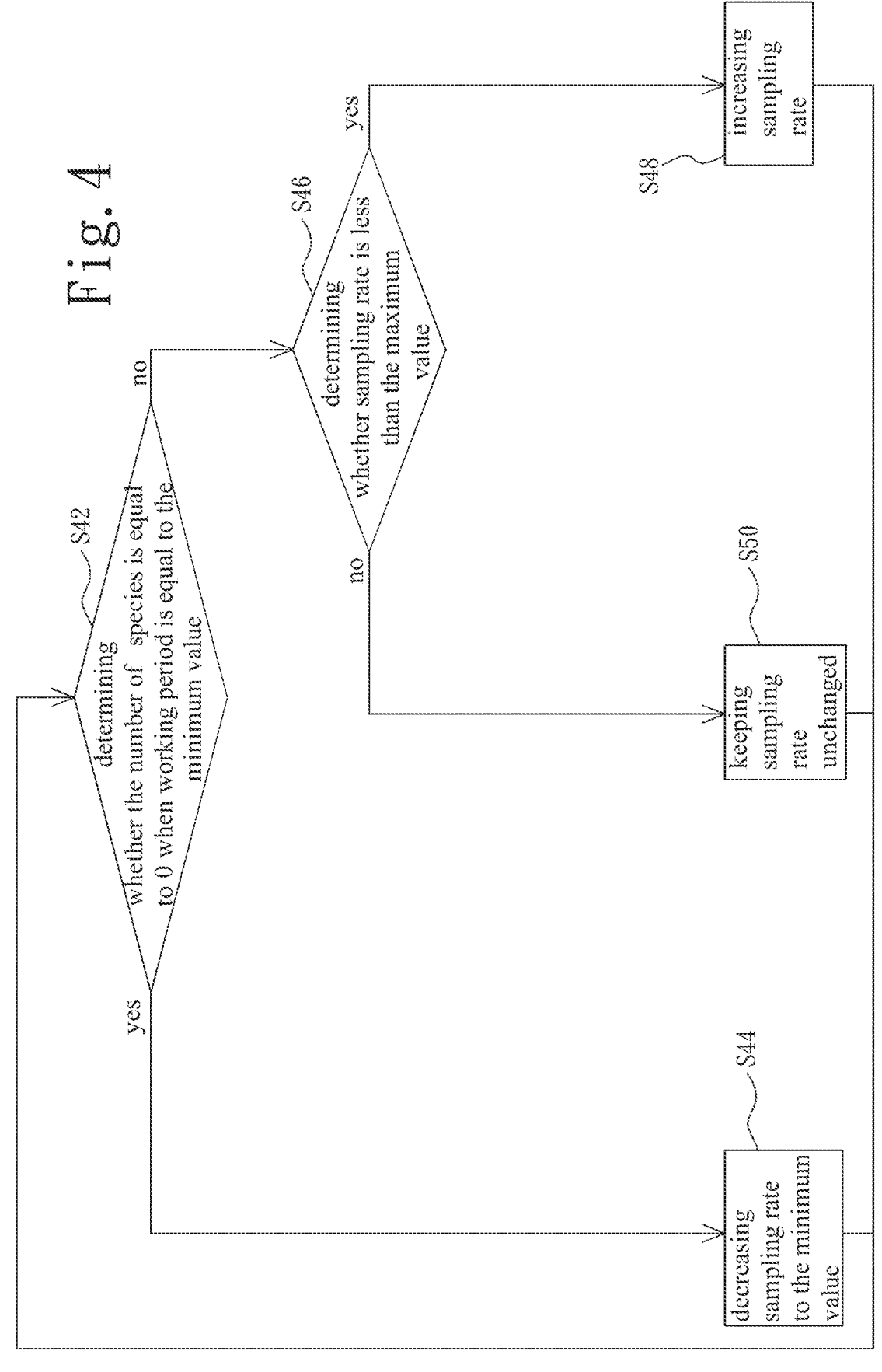
FIG. 4 is a flowchart of operating an audio recognition device according to further embodiment of the present invention.

FIG. 4 is a flowchart of operating an audio recognition device according to further embodiment of the present invention. Please refer to FIGS. 1 and 4. When the number of species SP corresponding to the various audio features F is equal to 0, the flowchart of FIG. 4 can minimize the usage of storage space. In Step S42, when the working period is equal to the minimum value, the audio processor 122 of the audio recognition device 12 determines whether the number of species SP corresponding to the various audio features F is equal to 0. When the working period is equal to the minimum value such that the number of species SP corresponding to the various audio features F is equal to 0, the process proceeds to Step S44. When the working period is equal to the minimum value such that the number of species SP corresponding to the various audio features F is not equal to 0 but greater than 0, the process proceeds to Step S46. In Step S44, the audio processor 122 of the audio recognition device 12 decreases the sampling rate to the minimum value. In Step S46, the audio processor 122 of the audio recognition device 12 determines whether the sampling rate is less than the maximum value. When the sampling rate is less than the maximum value, the process proceeds to Step S48. When the sampling rate is not less than the maximum value, the process proceeds to Step S50. In Step S48, the audio processor 122 of the audio recognition device 12 increases the sampling rate. In Step S50, the audio processor 122 of the audio recognition device 12 keeps the sampling rate unchanged. After Steps S44, S48 and S50, the process returns to Step S42.

Figure 5:
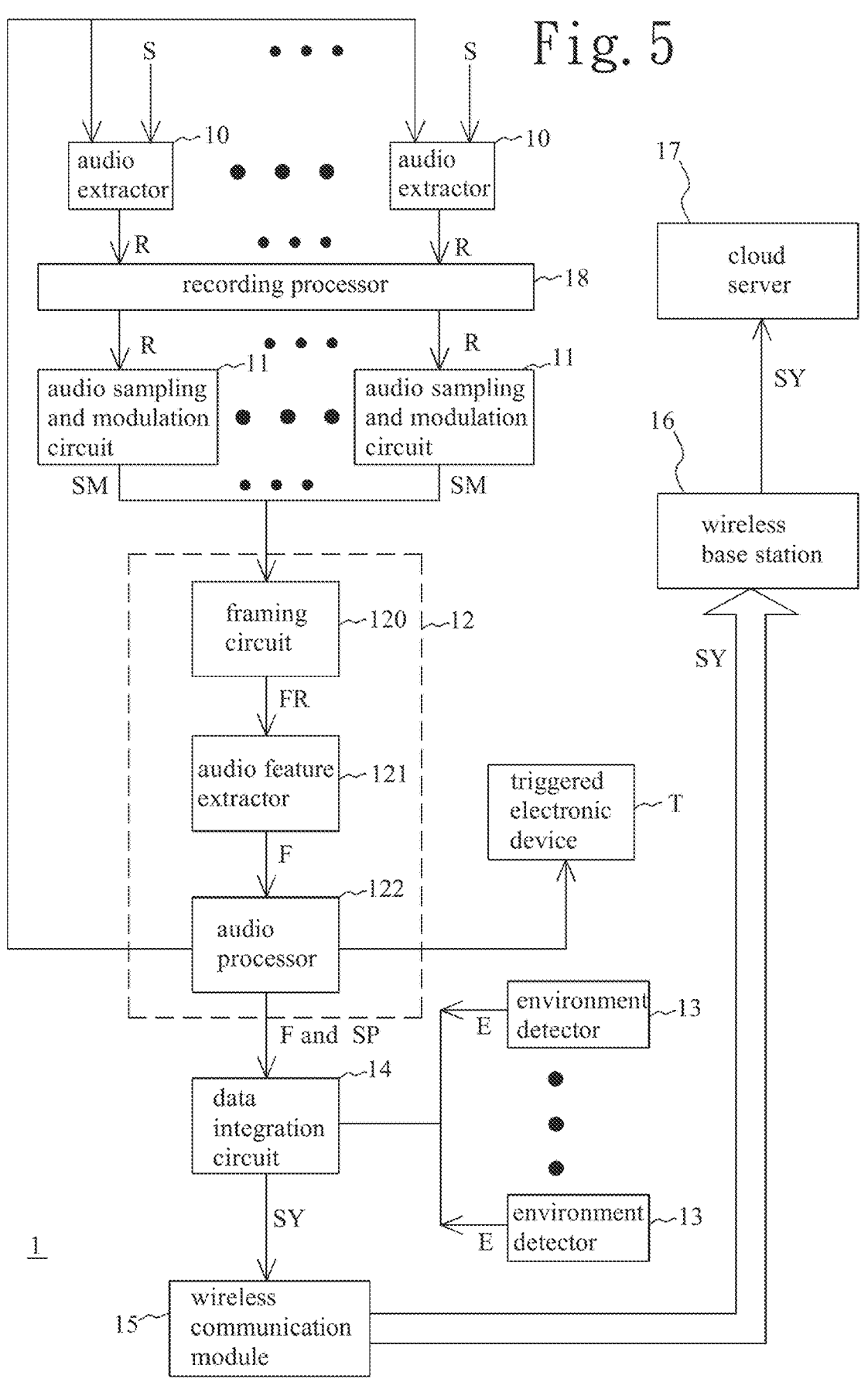
FIG. 5 is a schematic diagram illustrating a system for recognizing soundscapes according to a second embodiment of the present invention.

FIG. 5 is a schematic diagram illustrating a system for recognizing soundscapes according to a second embodiment of the present invention. Referring to FIG. 5, the second embodiment of the system for recognizing soundscapes. The second embodiment is different from the first embodiment in that the second embodiment further includes a recording processor 18 coupled to the audio extractors 10 and the audio sampling and modulation circuits 11. The audio extractors 10 transmit the recording voltages R to the recording processor 18. The other technical features of the second embodiment have been described previously so it will not be reiterated.

Figure 6:
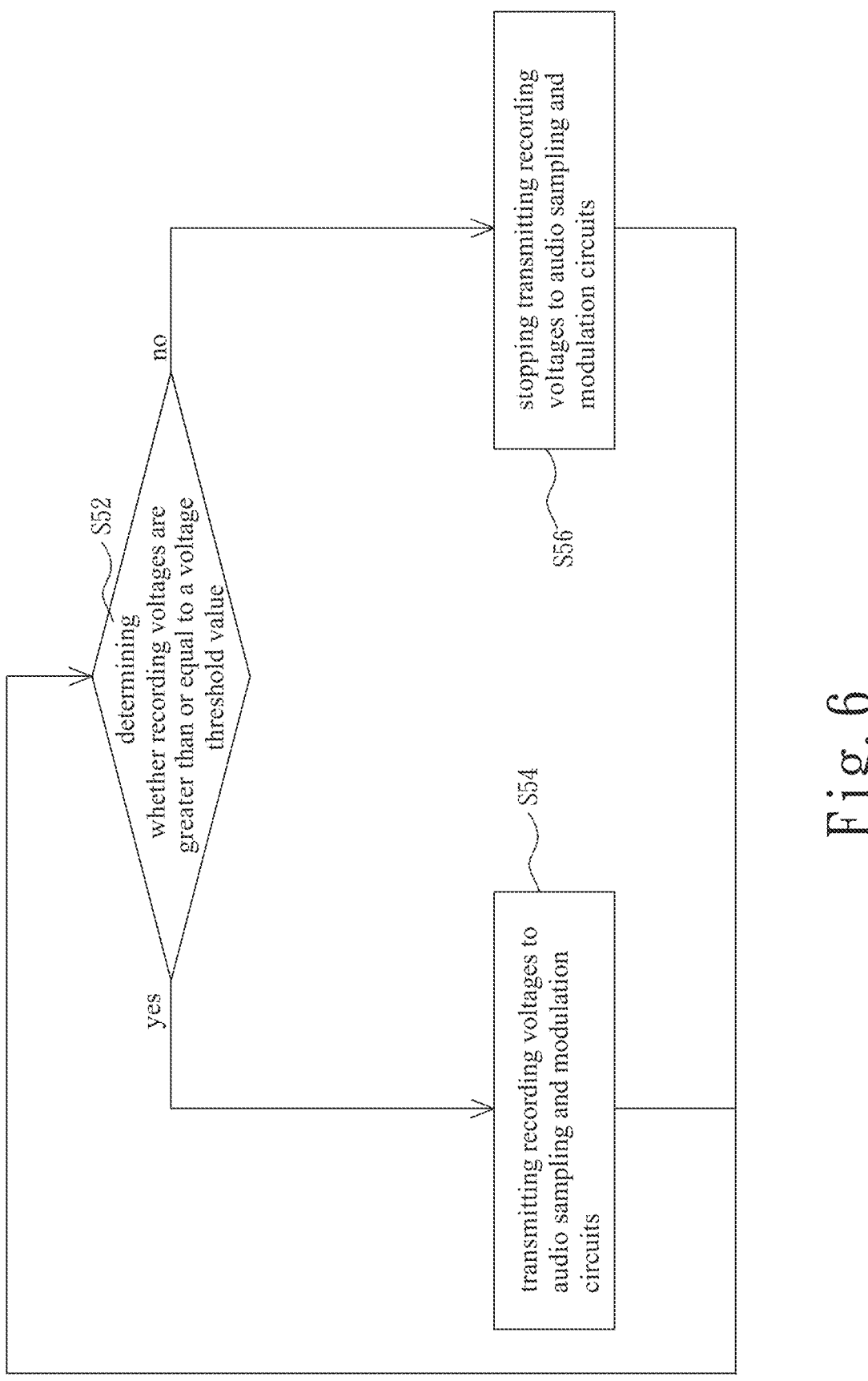
FIG. 6 is a flowchart of operating an audio processor according to an embodiment of the present invention.

FIG. 6 is a flowchart of operating an audio processor according to an embodiment of the present invention. Please refer to FIGS. 5 and 6. In Step S52, the recording processor 18 determines whether the recording voltages R are greater than or equal to a voltage threshold value. When the recording voltages R are greater than or equal to the voltage threshold value, the process proceeds to Step S54. When the recording voltages R are less than the voltage threshold value, the process proceeds to Step S56. In Step S54, the recording processor 18 respectively transmits the recording voltages R to the audio sampling and modulation circuits 11. In Step S56, the recording processor 18 stops transmits the recording voltages R to the audio sampling and modulation circuits 11 to save storage space and network bandwidth.

According to the embodiments provided above, the system for recognizing soundscapes adjusts the sampling rate, the working period, or both of the soundscape signal extracted by the audio extractor based on the number of species corresponding to the audio features and uses wireless technology to transmit the audio features to the cloud server to achieve a power-saving purpose.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A system for recognizing soundscapes comprising:
  audio extractors configured to extract soundscape signals and convert the soundscape signals into recording voltages;
  audio sampling and modulation circuits respectively coupled to the audio extractors and configured to respectively perform quantization and digital modulation on the recording voltages to respectively generate audio modulation signals;

an audio recognition device coupled to the audio extractors and the audio sampling and modulation circuits and configured to receive and recognize the audio modulation signals to generate various audio features, wherein based on biological audio models respectively corresponding to different species, the audio recognition device is configured to determine number of the species corresponding to the various audio features, the audio recognition device is configured to adjust a sampling rate, a working period, or both of the soundscape signal extracted by each of the audio extractors based on the number, and when the number is greater than 0, the audio recognition device outputs the various audio features and the species corresponding thereto;

environment detectors respectively configured to detect different environment-related data;

a data integration circuit coupled to the environment detectors and the audio recognition device and configured to synchronize the environment-related data, outputted the various audio features, and the species corresponding thereto to form sets of synchronization data;

a wireless communication module coupled to the data integration circuit;

a wireless base station wirelessly connected to the wireless communication module; and a cloud server coupled to the wireless base station and configured to receive the sets of synchronization data through the wireless base station and the wireless communication module.

2. The system for recognizing soundscapes according to claim 1, wherein the digital modulation comprises amplitude-shift keying (ASK) modulation, phase-shift keying (PSK) modulation, or frequency-shift keying (FSK) modulation.

3. The system for recognizing soundscapes according to claim 1, wherein the different environment-related data comprise light intensity, images, locations, temperature, humidity, and gas types.

4. The system for recognizing soundscapes according to claim 1, wherein the audio recognition device comprises:

a framing circuit coupled to the audio sampling and modulation circuits and configured to receive the audio modulation signals, wherein the framing circuit is configured to frame the audio modulation signals to generate sets of sound frames;

an audio feature extractor coupled to the framing circuit and configured to receive the sets of sound frames, wherein the audio feature extractor is configured to extract the various audio features from the sets of sound frames based on frequency and intensity corresponding to the sets of sound frames; and an audio processor coupled to the audio feature extractor, the audio extractors, and the data integration circuit and configured to receive the various audio features, wherein the audio processor is configured to determine the number of the species corresponding to the various audio features based on the biological audio models, thereby adjusting the sampling rate, the working period, or both, and when the number is greater than 0, the audio processor outputs the various audio features and the species corresponding thereto to the data integration circuit.

5. The system for recognizing soundscapes according to claim 1, wherein the wireless base station is a 3G base station, a 4G base station, a 5G base station, a Bluetooth® base station, or a WiFi base station.

6. The system for recognizing soundscapes according to claim 1, wherein the various audio features comprise pitch, loudness, and timbre.

7. The system for recognizing soundscapes according to claim 1, wherein when the number of the species corresponding to the various audio features is equal to 0 and the working period is greater than a minimum value, the audio recognition device decreases the working period; when the number of the species corresponding to the various audio features is equal to 0 and the working period is not greater than the minimum value, the audio recognition device keeps the working period unchanged; when the number of the species corresponding to the various audio features is greater than 0 and less than a preset value and the working period is less than a maximum value, the audio recognition device increases the working period; when the number of the species corresponding to the various audio features is greater than 0 and less than the preset value and the working period is not less than the maximum value, the audio recognition device keeps the working period unchanged; and when the number of the species corresponding to the various audio features is greater than 0 and not less than the preset value, the audio recognition device increases the working period to the maximum value.

8. The system for recognizing soundscapes according to claim 1, wherein when the number of the species corresponding to the various audio features is equal to 0 and the sampling rate is greater than a minimum value, the audio recognition device decreases the sampling rate; when the number of the species corresponding to the various audio features is equal to 0 and the sampling rate is not greater than the minimum value, the audio recognition device keeps the sampling rate unchanged; when the number of the species corresponding to the various audio features is greater than 0 and less than a preset value and the sampling rate is less than a maximum value, the audio recognition device increases the sampling rate; when the number of the species corresponding to the various audio features is greater than 0 and less than the preset value and the sampling rate is not less than the maximum value, the audio recognition device keeps the sampling rate unchanged; and when the number of the species corresponding to the various audio features is greater than 0 and not less than the preset value and the sampling rate is less than a maximum value, the audio recognition device increases the sampling rate to the maximum value.

9. The system for recognizing soundscapes according to claim 1, wherein when the working period is equal to a minimum value and the number of the species corresponding to the various audio features is equal to 0, the audio recognition device decreases the sampling rate to a minimum value; when the working period is equal to a minimum value, the number of the species corresponding to the various audio features is greater than 0, and the sampling rate is less than a maximum value, the audio recognition device increases the sampling rate; and when the working period is equal to a minimum value, the number of the species corresponding to the various audio features is greater than 0, and the sampling rate is not less than a maximum value, the audio recognition device keeps the sampling rate unchanged.

10. The system for recognizing soundscapes according to claim 1, further comprising a recording processor coupled to the audio extractors and the audio sampling and modulation circuits, wherein the audio extractors are configured to transmit the recording voltages to the recording processor, when the recording processor determines that the recording voltages are greater than or equal to a voltage threshold value, the recording processor respectively transmits the recording voltage to the audio sampling and modulation circuits, and when the recording processor determines that the recording voltages are less than the voltage threshold value, the recording processor stops transmitting the recording voltage to the audio sampling and modulation circuits.

11. The system for recognizing soundscapes according to claim 1, wherein the audio extractors comprise condenser microphones, microelectromechanical microphones, or ultrasonic microphones.

12. The system for recognizing soundscapes according to claim 1, wherein the audio extractors have waterproof housings or moisture-proof housings.

13. The system for recognizing soundscapes according to claim 1, further comprising at least one triggered electronic device coupled to the audio recognition device, wherein when the audio recognition device determines that the species corresponding to the various audio features includes at least one preset species, the audio recognition device turns on the at least one triggered electronic device.

14. The system for recognizing soundscapes according to claim 13, wherein the at least one triggered electronic device is a digital camera or an electronic speaker.

* * * * *